United States Patent [19]

Kabe et al.

[11] Patent Number: 4,691,752
[45] Date of Patent: Sep. 8, 1987

[54] PNEUMATIC RADIAL TIRE

[75] Inventors: Kazuyuki Kabe, Hiratsuka; Tuneo Morikawa, Hadano, both of Japan

[73] Assignee: Yokohama Rubber Co., Ltd., Tokyo, Japan

[21] Appl. No.: 728,590

[22] Filed: Apr. 29, 1985

[30] Foreign Application Priority Data

Apr. 30, 1984 [JP] Japan ................................ 59-86959

[51] Int. Cl.⁴ .............................................. B60C 9/22
[52] U.S. Cl. .................................. 152/527; 152/531; 152/532; 152/536; 152/537
[58] Field of Search ............... 152/526, 527, 531, 532, 152/536, 537, 538, 548, 560–561

[56] References Cited

U.S. PATENT DOCUMENTS

| 2,826,233 | 3/1958 | Cooper | 152/535 |
| 2,939,502 | 6/1960 | Hindin et al. | 152/531 |
| 3,667,529 | 6/1972 | Mirtain | 152/531 |
| 3,677,319 | 7/1972 | Mirtain | 152/531 |
| 3,682,221 | 8/1972 | Marzocchi et al. | 152/532 X |
| 4,262,726 | 4/1981 | Welter | 152/531 |
| 4,269,646 | 5/1981 | Miller et al. | 152/531 |
| 4,418,735 | 12/1983 | Musy | 152/531 |

FOREIGN PATENT DOCUMENTS 1067582  5/1967  United Kingdom ................ 152/532

Primary Examiner—Donald E. Czaja
Assistant Examiner—Ramon R. Hoch
Attorney, Agent, or Firm—Finnegan, Henderson, Farabow, Garrett & Dunner

[57] ABSTRACT

A pneumatic radial tire comprises (1) a pair of left and right bead portions, (2) a pair of left and right side-wall portions continuing from the respective bead portions, (3) a tread portion positioned between the side-wall portions, (4) a carcass layer provided between the left and right bead portions a cord angle of which is substantially 90 degree in relation to the circumferential direction of the tire, (5) an auxiliary carcass layer a cord angle of which is substantially 0 degree in relation to the circumferential direction of the tire, being placed on the tread side of the carcass layer substantially to correspond to the tread portion, so that the carcass layer and the auxiliary carcass layer may be crossed substantially at a right angle to form a net structure, and (6) a belt reinforcement layer having a tensile ridigity, at the circumferential of the tire, of not less than 10 kg/mm2, being placed on the auxiliary carcass layer substantially to correspond to the tread portion.

4 Claims, 7 Drawing Figures

PNEUMATIC RADIAL TIRE

This invention relates to a pneumatic radial tire, and more particularly to a pneumatic radial tire which is capable of reducing ply steer, which noticeably occurs in a radial tire, to substantially zero and which has an improved straight-running performance.

DESCRIPTION OF THE PRIOR ART

A conventional pneumatic radial tire for passenger cars is generally so constructed that at least two belt reinforcement layers are interposed between the tread and the carcass layer in such a manner that the belt reinforcement layers extend substantially parallel to the circumferential direction of the tire. The reinforcement cords in one of these belt reinforcement layers form an angle of 15°–30° with respect to the circumferential direction of the tire, and the reinforcement cords in the other an angle of 150°–165°. The reinforcement cords in one belt reinforcement layer and those in the other cross one another. The carcass layer consists of one or two layers, and the cords in each layer extend at substantially 90° to the circumferential direction of the tire. This type of tire has excellent braking performance, low fuel consumption and a high wear-resistance owing to the effect of the belt reinforcement layer as compared with a bias tire. However, this belt reinforcement layer causes the straight-running performance of a pneumatic radial tire to lower. While a pneumatic radial tire is rotated forward, a lateral force occurs toward the left or right with respect to the direction in which the tire advances, even when the slip angle is zero. Due to this lateral force, the vehicle often drifts off course.

In general, the lateral force occurring when the slip angle is zero consists of components which occur on the basis of two different mechansims. One of these components is called "conicity (CT)", and the other "ply steer (PS)" which is classified as a part of the uniformity properties of the tire. According to the method (JASO C607) of testing the uniformity of tires for automobiles and the definitions of conicity and ply steer, and if an average value of the lateral force occurring when a tire makes one revolution is represented by LFD, LFDw measured at the outer side of the tire, LFDs measured at the inner side of the tire after the tire is set inside out, and the abovementioned conicity CT and ply steer PS have the relation expressed by the following formulae.

$$LFDw = PS + CT \quad (1)$$

$$LFDs = PS - CT \quad (2)$$

PS and CT can be determined as follows from the above formulae (1) and (2).

$$CT = (LFDw - LFDs)/2 \quad (3)$$

$$PS = (LFDw + LFDs)/2 \quad (4)$$

The relation between the above (1), (2), (3) and (4) can be expressed by a graph shown in FIG. 1.

Distortion of conicity referred to above is thought to be the force occurring when the shape of a tire becomes geometrically asymmetric with respect to the center line in the circumferential direction of the tire, i.e. frustoconical when the tire rotates on the road. The occurrence of this force is ascribed mainly to the position of a belt reinforcement layer inserted into a tread of the tire. Therefore, conicity can be reduced by improving the manufacturing conditions of a tire. Ply steer is a specific force occurring due to the construction of the belt reinforcement layer. Accordingly, it has been considered substantially difficult to reduce the ply steer unless a construction of a belt reinforcement layer is changed.

DESCRIPTION OF THE INVENTION

The invention provides a pneumatic radial tire with reduction of ply steer (PS) down to zero. This improvement is attained by a laminate of a carcass layer and an auxiliary carcass layer which are crossed with each other at a right angle in respect to respective cords to form a net structure and a square meshed construction. It is also a result from an improvement in a belt reinforcement layer. A pneumatic radial tire of the invention comprises (1) a pair of left and right bead portions, (2) a pair of left and right side-wall portions continuing from the respective bead portions, (3) a tread portion positioned between the sidewall portions, (4) a carcass layer provided between the left and right bead portions a cord angle of which is substantially 90 degrees in relation to the circumferential direction of the tire, (5) an auxiliary carcass layer a cord angle of which is substantially 0 degree in relation to the circumferential direction of the tire, being placed on the tread side of the carcass layer substantially to correspond to the tread portion, so that the carcass layer and the auxiliary carcass layer may be crossed substantially at a right angle to form a net structure, and (6) a belt reinforcement layer having a tensile rigidity, at the circumferential of the tire, of not less than 10 kg/mm2, being placed on the auxiliary carcass layer substantially to correspond to the the tread portion.

In the invention, the carcass layer and the auxiliary carcass layer are laminated on each other and cords of the carcass layer and cords of the auxiliary carcass layer are crossed substantially at a right angle to form a net structure.

The invention will be illustrated in reference to working examples of the invention and the attached drawings.

DESCRIPTION OF THE PREFERRED EMBODIMENT:

An embodiment of the present invention will now be described in detail with reference to the drawings.

Figure 1:
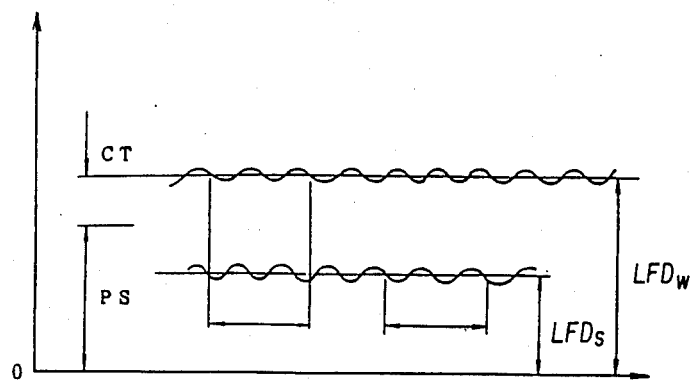
FIG. 1 is a diagram showing a relation between a running distance of a tire and a lateral force.
Figure 2:
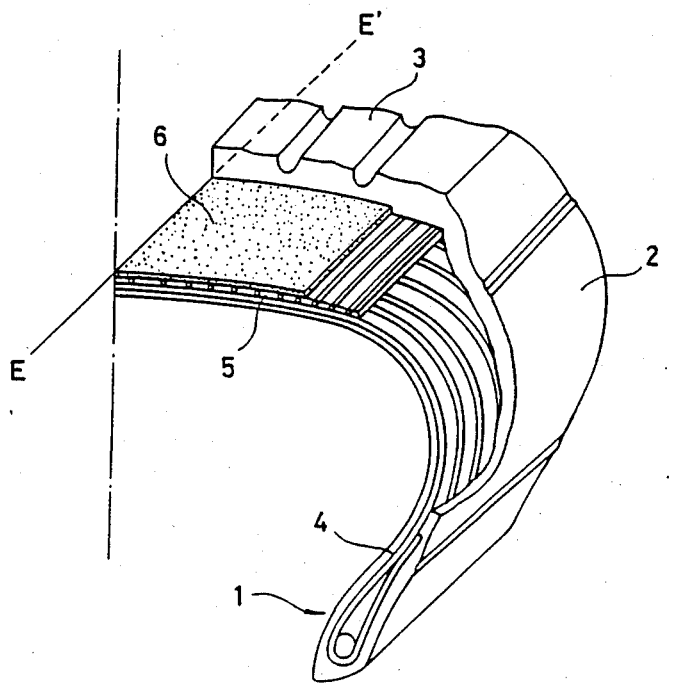
FIG. 2 shows a partially sectional view of a pneumatic radial tire of the invention.
Figure 3:
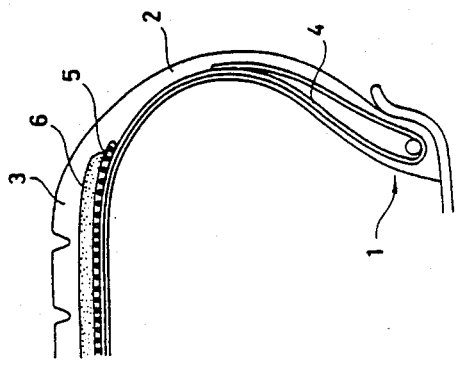
FIG. 3 is a partially sectional view of an embodiment of the invention.
Figure 4:
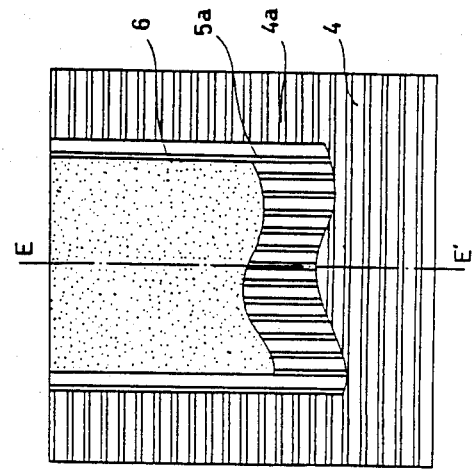
FIG. 4 is a developed view of the tire shown in FIG. 3.

FIG. 2 is a partially sectional view of an embodiment of a pneumatic radial tire according to the present invention, FIG. 3 is a cross-sectional view of the embodiment, and FIG. 4 a development of the embodiment. Referring to these drawings, a carcass layer 4 having a cord angle of substantially 90° with respect to the circumferential direction EE' of the tire is provided between left and right bead portions 1. An auxiliary carcass layer 5 consisting of cords 5a forming an angle of substantially 0° with respect to the circumferential direction EE' of the tire is provided on the portion of the carcass layer 4. The carcass layer is formed to cover a tread portion 3. The carcass layer 4 and the auxiliary carcass layer 5 form in combination a net structure such that respective cords of both layers may be crossed with each other at a right angle. A belt reinforcement layer 6 is provided on the auxiliary carcass layer 5 so as to extend in substantially the whole region of the tread portion 3. Reference numeral 2 denotes a side wall portion.

The carcass layer 4 consists of at least one layer. The cords constituting the carcass layer 4 generally consist of chemical fiber, such as nylon, polyester and aramide (aromatic polyamide fiber).

The cords in the auxiliary carcass layer 5 may consist of a regular tire material, preferably nylon and polyester. Also, steel cords, aramide cords and rayon cords can be used. These cords can be used selectively taking into consideration a lifting rate in the tire-molding vulcanization operation and the rigidity of a tire in the circumferential direction. For instance, a textile cord such as nylon cord, rayon cord and polyester cord, especially nylon cord, is preferable when a tire is vulcanized with a two piece-having mould having a high lifting rate. Steel cord and an aramide cord are preferable when a tire is vulcanized with a sectional mould so as to increase a rigidity at the circumferential direction.

The belt reinforcement layer 6 has a tensile rigidity of not less than 10 kg/mm2 at the circumferential direction. When it is less that 10 kg/mm2, a resulting tire will be inferior to a prior tire in respect to steering. It is preferable that a belt reinforcement layer 6 be formed by a plastic material (for example epoxy resin and polyurethane) or nylon, polyester, rayon, and short-fiber-reinforced rubber using carbon fiber. In order to form the belt reinforcement layer 6 with short-fiber-reinforced rubber, the length of the short fiber cord is set to not more than 50 mm for the purpose of preventing the torsional deformation, which occurs in the belt reinforcement layer is a prior tire of the kind. In order to form the belt reinforcement layer with a plastic material, consideration may not be given to the length of the cords in this manner since the torsional deformation does not occur. The circumferential tensile rigidity of the belt reinforcement layer 6 is measured with a dynamic visco-elasticity spectrometer under conditions including a frequency of 20 Hz, a strain of 2±0.2%, and a temperature of 25° C.

Figure 5:
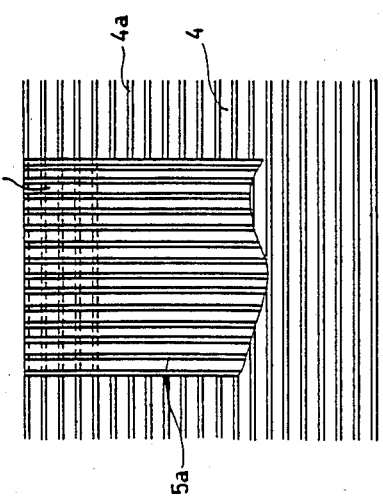
FIG. 5 is a developed view of the laminate having a net structure at a right angle in an embodiment of the invention.
Figure 6:
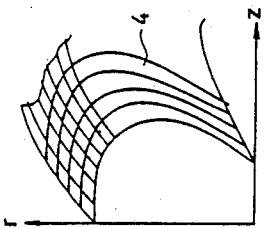
FIG. 6 illustrates a net structure of the invention.

According to the present invention, the angle of the cords with respect to the circumferential direction EE' of the tire in the auxiliary carcass layer 5 is substantially 0°, and the angle of the cords with respect to the circumferential direction EE' of the tire in the carcass layer 4 substantially 90°. Accordingly, the cords 5a in the auxiliary carcass layer 5 and the cords 4a in the carcass layer 4 cross each other at right angles as shown in FIGS. 5 and 6, so that a right-anlged net structure is formed. In the structure speciallized in the invention the primary elastic axes of the carcass layer 4 and the auxiliary carcass layer 5 agree with the cross-sectional direction and circumferential direction, respectively, of the tire, and extend at right angles to each other.

Since the pneumatic radial tire according to the present invention is constructed in the abovedescribed manner, it is capable of reducing ply steer to substantially zero while it rotates on the ground surface.

The effect of the present invention will now be described concretely with reference to Experimental Example.

EXPERIMENTAL EXAMPLE

A tire (tire according to the present invention) provided with an auxiliary carcass layer 5 on a carcass layer 4, and a belt reinforcement layer 6 on the auxiliary carcass layer as shown in FIGS. 2-4, and a comparative tire (conventional tire) provided with a belt reinforcement layer alone on a carcass layer were made. The specifications of these tires are as follows.

Performance of a tire tested is shown below.

Tire side: 185/70 HR 13.

Carcass layer: polyester of 1500 d/2 cord direction is the equatorial plane of the tire (90°) 40 ends, that is, 40 cords per 50 mm.

Auxiliary carcass layer: Nylon of 840 d/2 would twice 60 ends (measured in the direction at right angles to the direction in which the cords extend).

Belt reinforcement layer: Short-fiber-reinforced rubber layer. (Properties: Circumferential tensile rigidity—10.6 kg/mm. Carbon fibers having a diameter of 0.007 mm, an average length of 2.0 mm and a content (Vf) of 0.16 were used).

Specificiations of the conventional tire:

Tire size: Same as that of the tire according to the present invention.

Carcass layer: Same as that in the tire according to the present invention.

Belt reinforcement layer:
  No. 1 belt:
    1×5 (0.25)
    20°
    44 ends, namely 44 cords per 50 mm
  No. 2 belt:
    1×5 (0.25)
    20°
    44 ends, namely 44 cords per 50 mm
    (measured in the direction at right angles to the direction in which the cords extend.)

Regarding this tire according to the present invention and this conventional tire, a test for determined the ply steer, which is one of the typical characteristics representing the uniformity of a tire, was conducted. The method of testing the ply steer in these tires is in accordance with that defined in JASO C607. The results are shown in FIG. 7.

Figure 7:
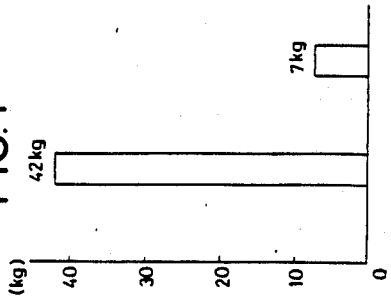
FIG. 7 is a diagram in which an comparison in ply steer is made between an embodiment of the tire according to the present invention and a conventional pneumatic radial tire.

As is clearly shown in FIG. 7, ply steer in the tire according to the present invention is reduced as compared with that in the conventional tire.

As described above, the present invention employs a right angled net structure of the laminate and a layer having special properties, such as a short-fiber-reinforced rubber layer as a belt reinforcement layer, so that ply steer, which is a drawback encountered in the conventional pneumatic radial tire, can be reduced to substantially zero.

The embodiments of the invention in which an exclusive property or privilege is claimed are defined as follows:

1. A pneumatic radial tire which comprises:
   (1) a pair of left and right bead portions,
   (2) a pair of left and right side-wall portions, continuing from the respective bead portions,
   (3) a tread portion positioned between the side-wall portions,
   (4) a carcass layer provided between the left and right bead portions, a cord angle of which is substantially 90 degrees in relation to the circumferential direction of the tire,
   (5) an auxiliary carcass layer, a cord angle of which is substantially 0 degrees in relation to the circumferential direction of the tire, being placed on the tread side of the carcass layer substantially to correspond to the tread portion, so that the carcass layer and the auxiliary carcass layer may be crossed substantially at a right angle to form a net structure, and
   (6) a belt reinforcing layer constructed from rubber reinforced with short fibers having a length of not more than 50 mm to provide a tensile rigidity, at the circumferential direction of the tire, of not less than 10-kg/mm2, said belt reinforcing layer being placed on the auxiliary carcass layer substantially to correspond to the tread portion with all belt layers in addition to said auxiliary carcass layer having a cord angle which is substantially 0 degrees in relation to the circumferential direction of the tire.

2. The tire of claim 1 wherein said short fiber cords are carbon fibers.

3. The tire of claim 2 wherein said carcass layer is constructed with polyester cords.

4. The tire of claim 3 wherein said auxiliary carcass layer is constructed with nylon cords.

* * * * *